C. E. CLAPP
AUTOMOBILE ATTACHMENT.
APPLICATION FILED NOV. 11, 1914.

1,164,925.

Patented Dec. 21, 1915.
2 SHEETS—SHEET 1.

Witnesses
G. F. Rudolph

Inventor
Clark E. Clapp,
By Victor J. Evans
Attorney

C. E. CLAPP.
AUTOMOBILE ATTACHMENT.
APPLICATION FILED NOV. 11, 1914.

1,164,925.

Patented Dec. 21, 1915.
2 SHEETS—SHEET 2.

Inventor
Clark E. Clapp,

Witnesses

By Victor J. Evans
Attorney

UNITED STATES PATENT OFFICE.

CLARK E. CLAPP, OF ST. JOSEPH, MISSOURI.

AUTOMOBILE ATTACHMENT.

1,164,925.  Specification of Letters Patent.  Patented Dec. 21, 1915.

Application filed November 11, 1914. Serial No. 871,538.

*To all whom it may concern:*

Be it known that I, CLARK E. CLAPP, a citizen of the United States, residing at St. Joseph, in the county of Buchanan and State of Missouri, have invented new and useful Improvements in Automobile Attachments, of which the following is a specification.

This invention relates to motor vehicles and more particularly to those parts associated with the front axle and steering gear.

One of the principal objects of the invention is to so connect the front axle with the chassis or frame of the vehicle that the frame will be maintained in a horizontal position irrespective of inaccuracies in the level of the road surface, in other words the parts are so designed that the front axle may have free movement relative to the frame or chassis and the chassis will be at the same time spring supported.

A further object of the invention is to provide a novel type of steering mechanism especially adapted for this type of vehicle and which is not affected by the change of position of the front axle relative to the frame or chassis and which will be operative in any position of the said axle.

Further objects of the invention will appear as the following specific description is read in connection with the accompanying drawings, which form a part of this application and in which—

Figure 1:
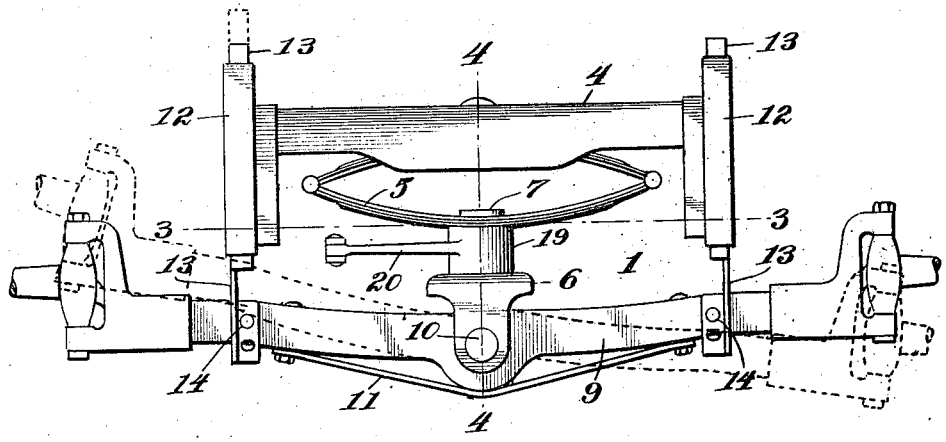
Figure 2:
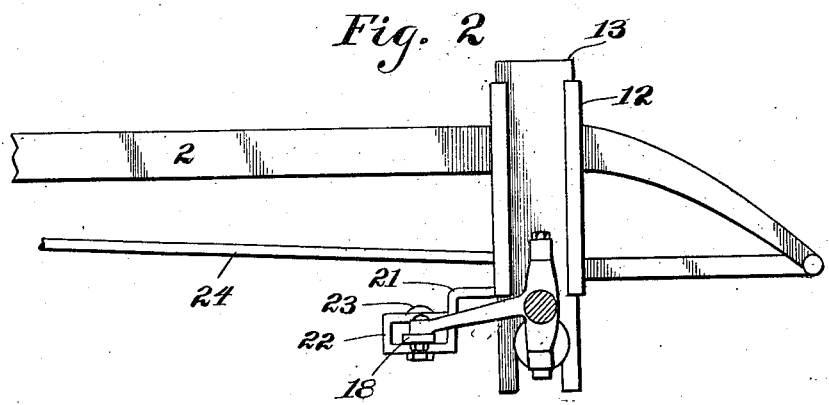
Figure 3:
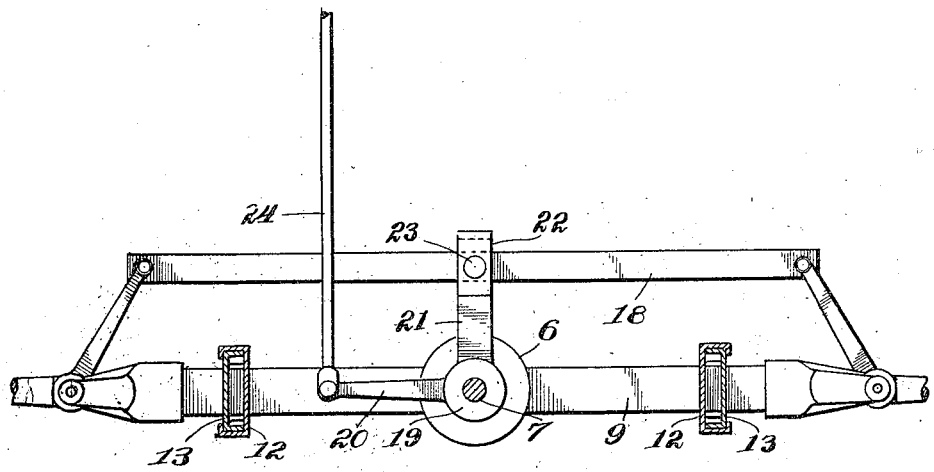
Figure 4:
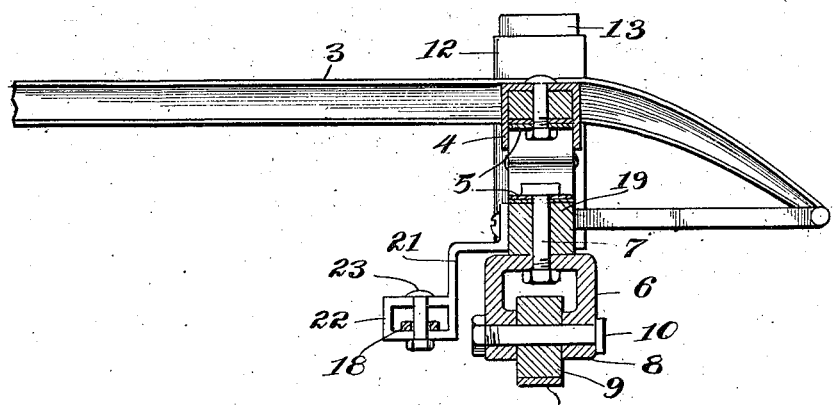

Figure 1 is a front elevation. Fig. 2 is a side elevation. Fig. 3 is a horizontal sectional view on the line 3—3 of Fig. 1. Fig. 4 is a vertical sectional view on the line 4—4 of Fig. 1.

Referring more particularly to the drawings, 1 represents the chassis of the vehicle, the side bars 2 and 3 of which are connected to the adjacent and forward ends by the usual bolster or cross piece 4. This bolster or cross piece is preferably constructed of channel iron and has secured within the same the upper leaf of an elliptical spring 5, the lower leaf of which is connected to a pivoting head 6 by a bolt 7 having an enlarged body for a purpose to be hereinafter described. The head 6 is provided with depending ears 8 which straddle the front axle 9 and are pivotally connected thereto by the bolt or pin 10, the axle being placed beneath this connection by a strut rod 11.

Secured to the opposite sides of the chassis are guide ways 12 in which are slidably mounted the bars 13 bifurcated at their lower ends so as to straddle the axle 9 and being pivotally connected thereto by the bolts 14. This arrangement of parts permits free movement of the axle at either end toward and away from the frame or chassis and thereby compensates for any inaccuracy in the level of the surface of the road, the body or chassis remaining level or approximately so. At the same time the proper resilient support for the body is provided by the spring 5 irrespective of the position of the axle with relation to the body.

Surrounding the bolt 7 and turable thereon is a sleeve 19 carrying the laterally projecting arms 20 and 21, the latter being provided at its outer end with a yoke 22 which straddles the rod 18 which is connected thereto by a bolt 23 which passes through said rod, the opening in the rod being of sufficient diameter to permit of the rocking of the cross rod 18 with the axle 9. The arm 20 is connected to the steering post (not shown) in any suitable manner through the link or rod 24, which is adapted to be reciprocated longitudinally of the vehicle so as to turn the sleeve 19 upon the bolt 7.

What is claimed is:—

1. In a motor vehicle, a body supporting frame, a spring connected thereto, an axle pivotally connected to the spring and adapted for free vertical movement at opposite ends oward and away from the frame, said axle having pivotal wheel supporting ends, means journaled on the pivotal connection and connected to said ends for steering the vehicle and co-acting means carried by the frame and axle which permit oscillation of the axle, but prevents rotary movement thereof.

2. In a motor vehicle, a body supporting frame, a spring connected thereto, an axle, a central pivotal connection between the axle and the spring, said axle having pivotal wheel supporting ends, means for connecting said ends, means journaled upon the pivotal connection and coupled with the connecting means, and a steering mechanism for rotating said last named means.

3. In a motor vehicle, a body supporting frame, a spring connected thereto, an axle, a shaft pivotally connected to the axle and rigidly to the spring, a sleeve journaled upon said shaft, pivoted wheel supporting members on the outer ends of the axle, means for connecting the said wheel supporting members, a sleeve journaled on said shaft and having a yoke connected to and straddling the connecting means, and a steering mechanism for turning the sleeve upon the shaft.

4. In a motor vehicle, a body supporting frame, a spring connected thereto, an axle, a central pivotal connection between the axle and the spring, said axle having pivotal wheel supporting ends, means for connecting said ends, means journaled upon the pivotal connection and coupled with the connecting means, a steering mechanism for rotating said last named means, guides carried by the frame and means pivotally mounted adjacent opposite ends of the axle and slidably arranged in the guides for preventing horizontal rotation of the axle.

In testimony whereof I affix my signature in presence of two witnesses.

CLARK E. CLAPP.

Witnesses:
   JOSEPH RENNER,
   CHAS. F. SCHAAF.